Aug. 5, 1952  J. G. PARTCH ET AL  2,605,640
CLEANABLE SIGHT GLASS IN GAUGES
Filed Oct. 8, 1949
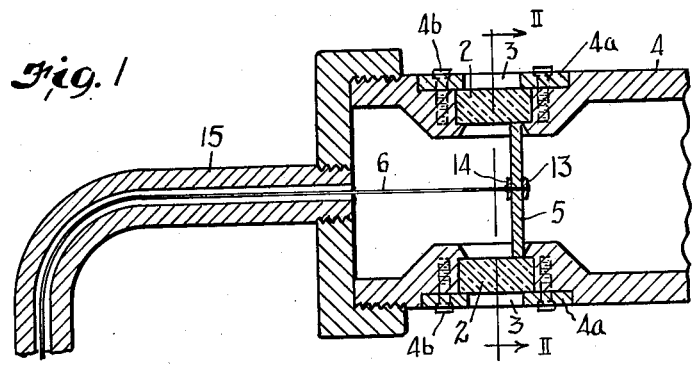
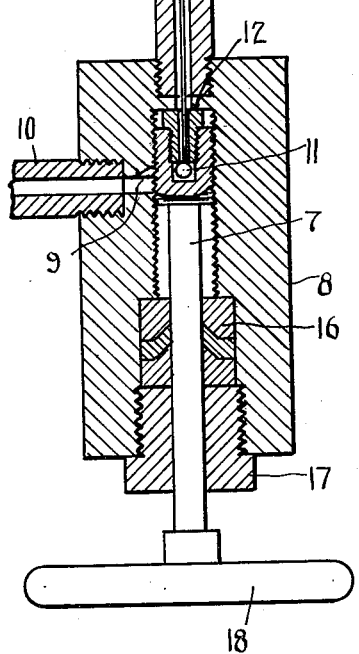
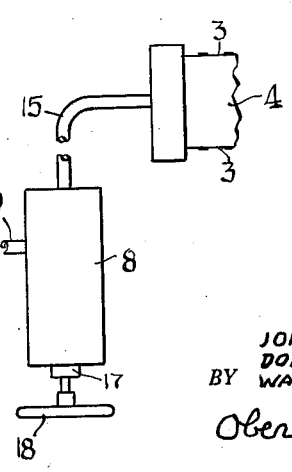
INVENTORS
JOHN G. PARTCH,
DONALD R. DAY AND
BY WARNER E. SCOVILL
Oberlin & Limbach
ATTORNEYS.

Patented Aug. 5, 1952

2,605,640

UNITED STATES PATENT OFFICE 2,605,640

CLEANABLE SIGHT GLASS IN GAUGES

John G. Partch, South Euclid, Donald R. Day, Garfield Heights, and Warner E. Scovill, Lakewood, Ohio, assignors to The Standard Oil Company, Cleveland, Ohio, a corporation of Ohio Application October 8, 1949, Serial No. 120,296

5 Claims. (Cl. 73—324)

In apparatus operating with liquids, sight glasses as in liquid level gauges, etc., are prone to become obscured by a deposit of matter on their inner face. In steam boiler practice it is not unusual for such a condition to require dismounting of the glass and cleaning, the valves as arranged on the water-column connections making this possible. Some devices have been proposed for facilitating cleaning by a hand-operated piston or the like which ordinarily is retracted to a position below the gauge glass. In very high pressure apparatus such as is employed in certain chemical operations and in laboratories, even this sort of arrangement has not been applicable, however. In accordance with the present invention a construction may be had which not only takes care of the cleaning of the glass, but does this in a manner particularly convenient, being associated with valve means for drawing off the liquid in checking levels or sampling purposes. Other objects and advantages of the invention will appear from the following description.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a horizontal section through the gauge glass portion of a high pressure apparatus, showing the associated valve turned into the same plane for convenience of illustration;

Fig. 1a is a small scale outline view of the construction in Fig. 1 with a valve added on outlet 10; and Fig. 2 is a transverse section taken on a plane substantially indicated by line II—II of Fig. 1.

In general, the construction involves a sight glass liquid level gauge having a cleaning element to sweep the inner face of the glass, and having a valve associated for checking the liquid, drawing off samples, etc.

As illustrated in Fig. 1, a sight gauge with glass sights 2 suitably mounted at openings 3 in the metal wall of the container 4 provides a through view of the contents between. It will be understood that the container 4 may be any vessel to which a gauge is adaptable, and thus including high pressure or vacuum chemical apparatus, equilibrium cells, reaction bombs, etc., for instance. The mounting of the glass in the container walls may be by any usual or desired means permitting assembly and suitable securing of the glass and metal. And it will be understood that any suitable packing or cementing is included for tight joints. Arranged to sweep the inner face of the glass for cleaning the same is a cleaner element 5. While in some cases this may be of metal, where the contents of the container permit it is preferable to employ a plastic material having some resilience and yield and being relatively inert chemically. For instance, polymerized tetrafluoroethylene is a suitable material for quite a wide range of container contents. Such cleaning element is shaped to fit within the glass and scrape its surface when moved thereover. It is seen that the cleaning element 5 does not obstruct the flow of fluid, as space is left around the cleaner. For operating the cleaner, a connection 6 is provided to the stem 7 of the valve 8. Where the valve is out of direct alignment with the cleaner, as illustrated in Fig. 1, a convenient operating connection is afforded by a sufficiently thick push-pull wire as the connection 6. The valve stem 7 when operated, as by the handwheel 18, can be withdrawn in the valve body. And in such movement, it is seen that the connecting wire 6 will draw the cleaner 5 to the left as shown in the drawing, and thereby clean the inside glass surface. The connection between the valve stem and the push-pull element 6 and the cleaner 5 is sufficiently swiveled at one or more points such that while the valve stem 7 has a rotary motion as advanced by its screwthreaded engagement in the valve body 8, the swivel connection allows the push-pull element 6 to be advanced or retracted without itself rotating, and thus the cleaner 5 is pulled or pushed across the glass surface without rotational change. Additionally, if desired, the shaping of the adjacent metal portion may be such as to afford guide means for the cleaner element. The swivel-connection may involve a rounded head 11 at the valve end of the push-pull wire 6, such that the head permits relative movement where bearing against the retaining plug 12 which is tapped into the end of the valve stem and allows the wire 6 to pass loosely through. Again, if desired, there may be a swiveled connection at the cleaner element 5, the retainers 13, 14 being secured to the wire 6 but not to the cleaner 5. However, it is preferable to apply the retainers 13 and 14 tightly against the cleaner element 5 and allow all rotary movement to occur at the surfaces between the head 11 and the retainer 12, wear at the cleaner element being thereby eliminated. As seen, the push-pull wire travels through a conduit 15 which connects the space of the container 4 to the valve 8 and outlet 10. The latter may be short or as long as desirable in any given case; and any desired angle of relationship may be had. A shut-off valve may be carried also at the end of outlet 10 if desired. By having the stem 7 in screw-threaded engagement with the valve body and provided with suitable gasket packing 16 held by retainer 17, the valve stem may be manipulated by the handwheel 18 as desired; either in sufficient withdrawal to uncover the port 9 and allow escape of fluid as for sampling, or by less complete withdrawal the port may be left covered, the movement of the valve stem in either case serving to move the cleaner element 5 and clean the sight glass. If a suitable valve $v$, Fig. 1a, be added on outlet 10, control on liquid outflow may be had even when the port 9 is uncovered. This ability to sweep the sight glass by operation of the valve stem either to simultaneously withdraw fluid or in partial extent merely to clean the glass, is seen to be of especial convenience. As readily seen, the length designed for the travel of the valve stem will in any given case depend primarily upon the length of the gauge glass and length of movement required, and the threads of the valve stem may be of such a pitch as consistent in any given case. The remote control by the flexible push-pull wire in its conduit is of great advantage, in permitting any convenient positioning, irrespective of the location of the gauge.

The manner of use of the device is readily understood from the foregoing. On turning the handwheel 18, the valve stem 7 is retracted, and the cleaning element 5 is drawn across the surface of the glass. By retracting the valve stem sufficiently to uncover the port 9, fluid is withdrawn. Or, with a further shut-off valve at the end of outlet 10 as above-indicated, fluid withdrawal may be controlled by it when port 9 is uncovered. On returning the valve to fully closed position, the cleaner is again moved across the surface of the glass to a position out of the way.

Other modes of applying the principle of the invention may be employed, change being made as regards the details described, provided the features stated in any of the following claims or the equivalent of such be employed.

We therefore particularly point out and distinctly claim as our invention:

1. In apparatus of the character described, a sight glass, a cleaning element to sweep the inside surface thereof, a draw-off connection at a point below said glass including a valve body having screw-threads internally, a valve stem cooperating therein, and means in common for the operation of the valve and said cleaning element including a push-pull wire swivelly connected to said valve stem and having a connection to said cleaning element whereby to reciprocate it by operation of the valve.

2. In apparatus of the character described, a sight glass, a cleaning element to sweep the inside surface thereof, a draw-off connection at a point below said glass including a valve body having screw-threads internally, a valve stem cooperating therein, and means in common for the operation of the valve and said cleaning element including a push-pull element connected between said valve stem and said cleaning element.

3. In apparatus of the character described, a sight glass, a cleaning element to sweep the inside surface thereof, a draw-off connection at a point below said glass including a valve body, a valve stem therein, and means in common for the operation of the valve and said cleaning element including a push-pull element connected between said valve stem and said cleaning element.

4. In apparatus of the character described, a sight glass, a cleaning element to sweep the inside surface thereof, a draw-off conduit, a valve body for said conduit, a movable valve stem in said valve body, and means in common for the operation of the valve and said cleaning element including an operating connection from said valve stem to said cleaning element.

5. In apparatus of the character described, a sight glass, a cleaning element to sweep the inside surface thereof, a draw-off outlet, a valve controlling said outlet, and combined means for operating the valve and the cleaning element, said means comprising a valve stem with a connection to the cleaning element.

JOHN G. PARTCH.
DONALD R. DAY.
WARNER E. SCOVILL.

REFERENCES CITED

The following references are of record in the file of this patent:

UNITED STATES PATENTS

| Number | Name | Date |
|---|---|---|
| 210,261 | Kunkle | Nov. 26, 1878 |
| 640,442 | Clarke | Jan. 2, 1900 |
| 1,234,191 | Mahaley | July 24, 1917 |
| 2,466,437 | Jurs | Apr. 5, 1949 |

FOREIGN PATENTS

| Number | Country | Date |
|---|---|---|
| 3,026 | Great Britain | 1865 |